(12) United States Patent
Jones

(10) Patent No.: US 7,302,123 B2
(45) Date of Patent: Nov. 27, 2007

(54) DYNAMIC OPTICAL WAVEGUIDE SENSOR

(75) Inventor: Richard T. Jones, Hamden, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 251 days.

(21) Appl. No.: 11/076,706

(22) Filed: Mar. 10, 2005

(65) Prior Publication Data

US 2006/0204174 A1 Sep. 14, 2006

(51) Int. Cl.
G02B 6/00 (2006.01)
G02B 6/34 (2006.01)

(52) U.S. Cl. .......................................... 385/12; 385/37
(58) Field of Classification Search ................... 385/12, 385/37, 27, 31, 39, 4, 5
See application file for complete search history.

(56) References Cited

U.S. PATENT DOCUMENTS

| | | | |
|---|---|---|---|
| 6,016,702 A | 1/2000 | Maron | |
| 6,422,084 B1 | 7/2002 | Fernald et al. | |
| 2003/0141440 A1 | 7/2003 | Kim et al. | |
| 2004/0202399 A1* | 10/2004 | Kochergin et al. ............ | 385/12 |

OTHER PUBLICATIONS

GB Search Report, Application No. 0604917.5, dated Jun. 30, 2006.

* cited by examiner

*Primary Examiner*—Frank G. Font
*Assistant Examiner*—Michael P. Mooney
(74) *Attorney, Agent, or Firm*—Patterson & Sheridan, L.L.P.

(57) ABSTRACT

Methods and apparatuses that sense physical parameters, such as pressure and strain, using optical waveguide sensors are described. A light source emits light at a predetermined wavelength along an optical waveguide having a fiber Bragg grating optical sensing element. That sensing element reflects light in accord with a sloped shape function of reflected light amplitude verses wavelength. A receiver converts the reflected light into electrical signals and an analyzer then determines a physical parameter based on changes of amplitude of the reflected light. The analyzer also maintains the wavelength of the light such that the wavelength corresponds to a slope wavelength of the shape function.

12 Claims, 4 Drawing Sheets

DYNAMIC OPTICAL WAVEGUIDE SENSOR

BACKGROUND OF THE INVENTION

1. Field of the Invention

Embodiments of the present invention generally relate to optical waveguide sensors, and more particularly to a fiber Bragg grating optical waveguide sensors that dynamically senses strain induced by a stimuli acting upon a transduction mechanism.

2. Description of the Related Art

A fiber Bragg grating (FBG) is an optical element that is formed by a photo-induced periodic modulation of the refractive index of an optical waveguide's core. An FBG element is highly reflective to light having wavelengths within a narrow bandwidth that is centered at a wavelength that is referred to as the Bragg wavelength. Other wavelengths pass through the FBG without reflection. The Bragg wavelength itself is dependent on physical parameters, such as temperature and strain, that impact on the refractive index. Therefore, FBG elements can be used as sensors to measure such parameters. After proper calibration, the Bragg wavelength acts is an absolute measure of the physical parameters.

One way of using fiber Bragg grating elements as sensors is to apply strain from an elastic structure (e.g., a diaphragm, bellows, etc.) to a fiber Bragg grating element. For example, U.S. Pat. No. 6,016,702, issued Jan. 25, 2000, entitled "High Sensitivity Fiber Optic Pressure Sensor for Use in Harsh Environments" by inventor Robert J. Maron discloses an optical waveguide sensor in which a compressible bellows is attached to an optical waveguide at one location while a rigid structure is attached at another. A fiber Bragg grating (FBG) is embedded within the optical waveguide between the compressible bellows and the rigid structure. When an external pressure change compresses the bellows the tension on the fiber Bragg grating is changed, which changes the Bragg wavelength.

Another example of using fiber Bragg grating elements as pressure sensors is presented in U.S. Pat. No. 6,422,084, issued Jul. 23, 2002, entitled "Bragg Grating Pressure Sensor" by Fernald, et al. That patent discloses optical waveguide sensors in which external pressure longitudinally compresses an optical waveguide having one or more fiber Bragg grating. The optical waveguide can be formed into a "dog bone" shape that includes a fiber Bragg grating and that can be formed under tension or compression to tailor the pressure sensing characteristics of the fiber Bragg grating. Another fiber Bragg grating outside of the narrow portion of the dog bone can provide for temperature compensation.

While the foregoing pressure sensing techniques are beneficial, those techniques may not be suitable for all applications. Therefore, fiber Bragg grating techniques suitable for dynamically sensing varying parameters such as pressure and strain would be useful. Also useful would be fiber Bragg grating techniques that provide for both static and dynamic measurements of parameters.

SUMMARY OF THE INVENTION

Embodiment of the present invention generally provides for optical waveguide measurement techniques that are suitable for sensing dynamically varying physical parameters such as pressure and strain. Furthermore, embodiments of the present invention also provide for both static and dynamic measurements of physical parameters.

The foregoing and other objects, features, and advantages of the present invention will become more apparent in light of the following detailed description of exemplary embodiments thereof.

BRIEF DESCRIPTION OF THE DRAWINGS

So that the manner in which the above recited features of the present invention can be understood in detail, more particular descriptions of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides for optical waveguide measurement systems that are suitable for sensing dynamically varying physical parameters such as pressure and strain. Some embodiments of the present invention enable both static and dynamic measurements of physical parameters. Embodiments of the present invention are suitable for use in harsh environments as found in oil and/or gas wells, engines, combustion chambers, etc.

Figure 1:
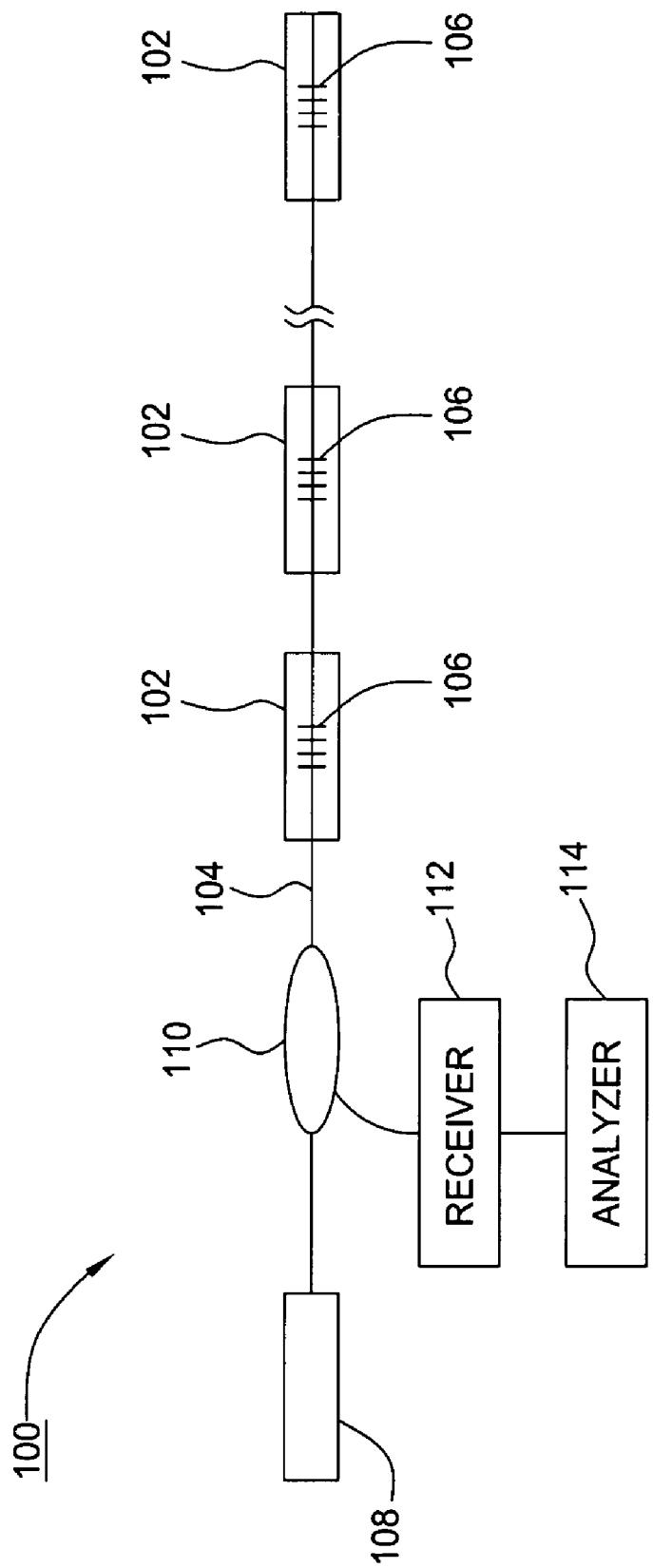
FIG. 1 illustrates an optical waveguide sensor having a sequence of sensors disposed along the optical waveguide.

FIG. 1 illustrates an optical waveguide sensor system 100 having a sequence of sensors 102 disposed along an optical waveguide 104. Each sensor 102 includes at least one fiber Bragg grating 106. Depending on the application and the specific configuration, the sensor system 100 can be operated in various ways. For example, a tunable light source 108, such as a tunable laser or a broadband light source mated with a tunable filter, can inject light that is swept over a bandwidth into a coupler 110. The coupler 110 passes the light onto the optical waveguide 104. Reflections at the Bragg wavelengths of the various fiber Brag gratings 106 occur. The coupler 110 passes those reflections into a receiver 112. The fiber Bragg gratings 106 are disposed such that the Bragg wavelengths depend on a physical parameter of interest. The output of the receiver 112 is passed to an analyzer 114 that determines from the Bragg wavelengths a measurement of the physical parameter of interest sensed by the sensors 102. Alternatively, if each sensor in a string has a different wavelength, then a broadband light source without a tunable filter can be used as a signal can still be received from each sensor at the receiver 112.

Figure 2:
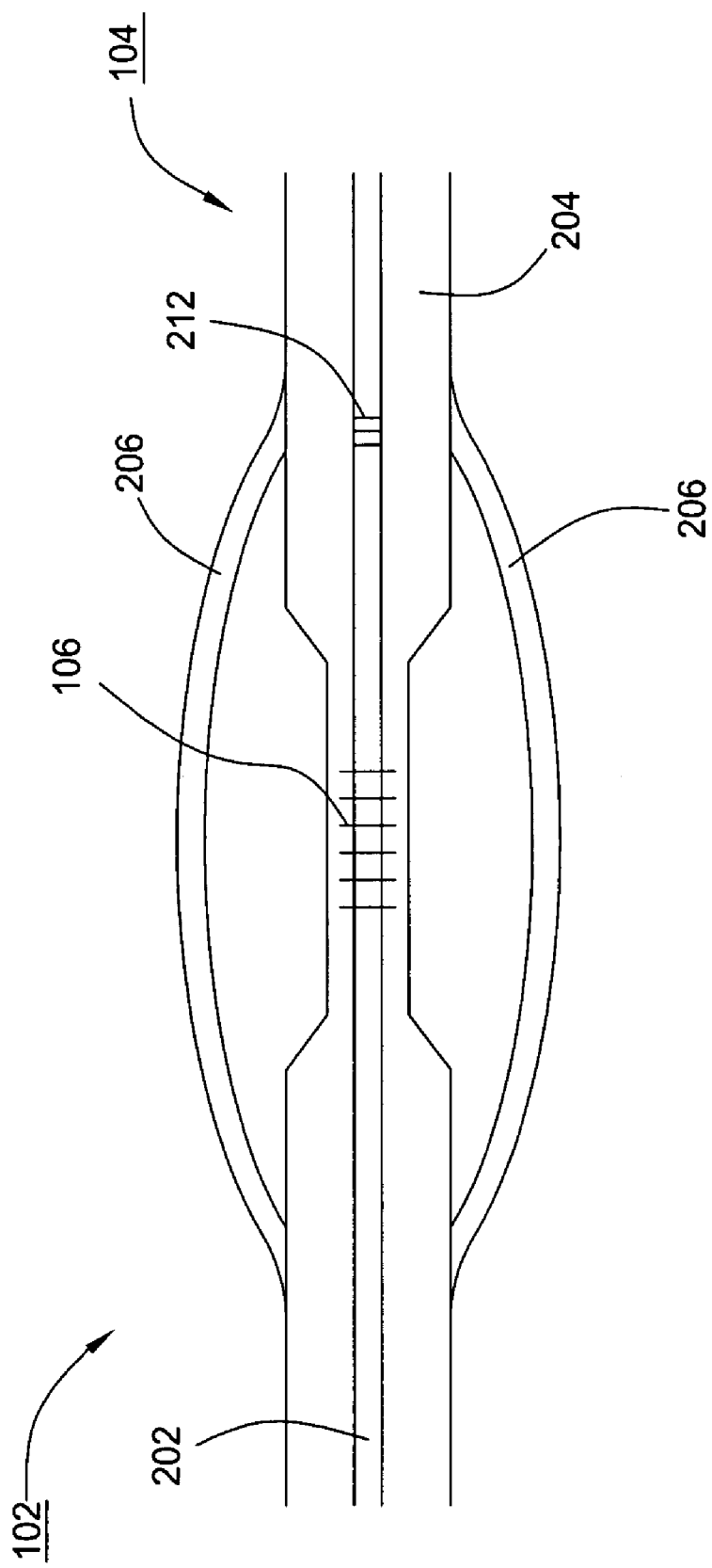
FIG. 2 illustrates a dog bone pressure sensor having both a fiber Bragg grating pressure sensor and a fiber Bragg grating temperature sensor.

FIG. 2 illustrates an exemplary sensor 102 that is suitable for measuring parameters such as pressure and strain. The optical waveguide 104 includes a narrow core 202 that passes through a relatively thick cladding layer 204. That cladding layer is thinned around the fiber Bragg grating 106 to form a narrow section that includes the fiber Bragg grating 106. Around the narrow section is a shell 206 that is integrally mated with the cladding layer 204. To adjust the characteristics of the resulting sensor 102, when the shell 206 is mated with the cladding layer 204 the optical waveguide 104 could be under tension, under a slight compression (a large compression would tend to buckle the narrow section), or, more typically, unbiased. The result is a fiber Bragg grating having a particular Bragg wavelength. When external pressure or strain is applied to the shell 206, longitudinal tension or compression occurs and the Bragg wavelength changes. A second fiber Bragg grating 212 outside of the narrow section can be included to provide a reference inside of the shell 206 for temperature compensation.

Figure 3:
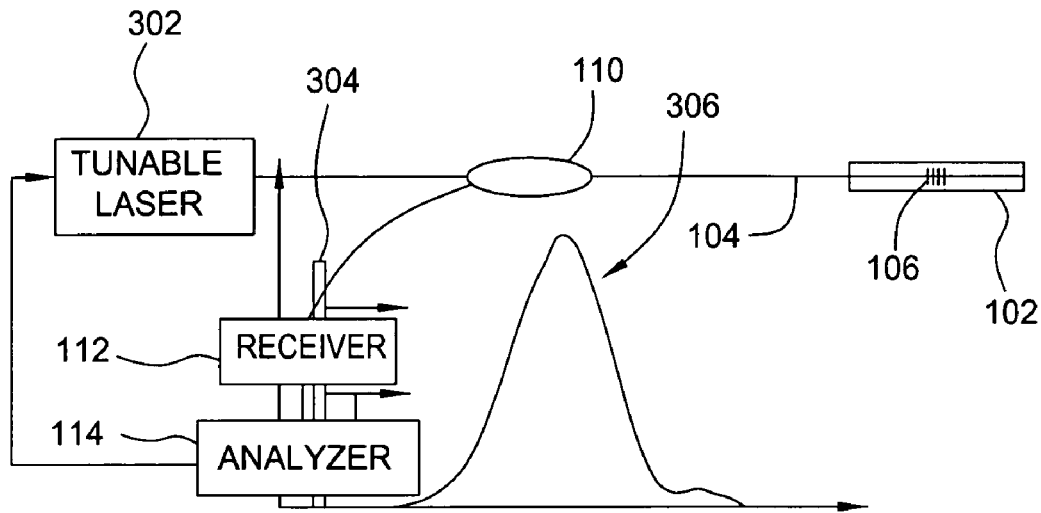
FIG. 3 illustrates a swept frequency optical waveguide measurement system that can be used for both dynamic and static measurements.
Figure 4:
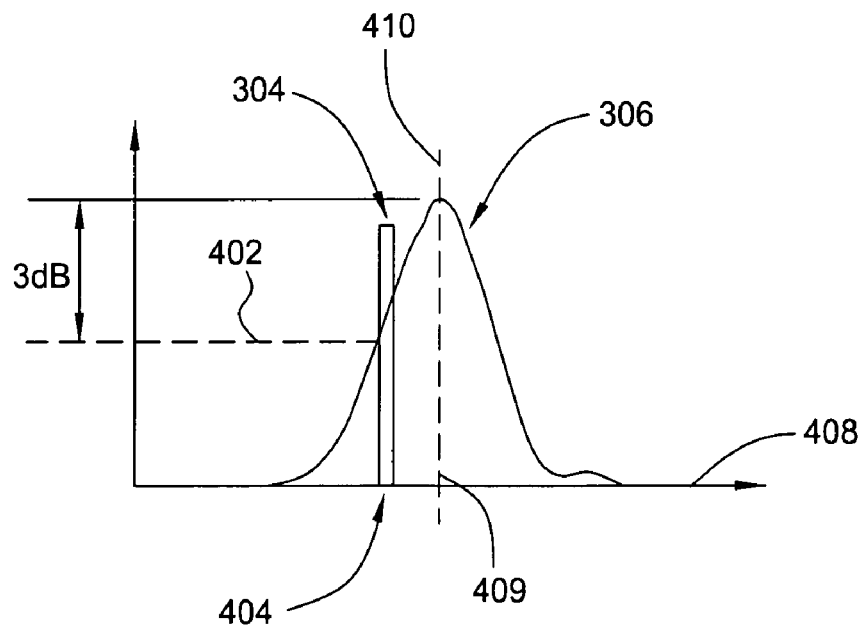
FIG. 4 schematically illustrates parking a narrow line width laser on the slope of a fiber Bragg grating.

FIG. 3 illustrates a tunable laser method of using optical sensors 102 to provide dynamic (AC) measurements. In that method, a tunable laser 302 produces a narrow line width laser pulse 304 that is coupled by a coupler 110 into an optical waveguide 104 having at least one optical sensor 102. The wavelength of the narrow line width laser pulse 304 is swept through a wavelength band that includes the Bragg wavelength of the fiber Bragg grating 106 in the optical sensor 102. The shape function 306 of the fiber Bragg grating 106, that is, its amplitude (Y-axis) verses wavelength (X-axis) characteristics, is determined by a high frequency receiver 112 and an analyzer 114. Referring now to FIG. 4, a particular power level, say the 3dB point down from the peak 402, is selected by the analyzer. Then, the analyzer sets the wavelength of the tunable laser 302 to the wavelength 404 that corresponds to the selected power level. Thus, the wavelength of the tunable laser 302 is set at a specific wavelength that is on the shape function 306. Then the intensity of the reflected light is monitored. Variations in the intensity correspond to dynamic pressure changes impressed on the optical sensor 102. The high frequency receiver 112 and the analyzer 114 can provide wavelength and amplitude information from the variations in intensity.

The foregoing method illustrated with the assistance of FIGS. 3 and 4 can also provide static pressure measurements. Since the position of the shape function 306 with respect to wavelength (shown in X-axis) depends on static pressure, the analyzer 114 can determine static pressure based on the wavelength position 409 of the peak 410 fiber Bragg grating reflection. It should be understood that while FIGS. 3 and 4 only illustrate one optical sensor 102 the optical waveguide 104 could have numerous optical sensors 102.

Figure 5:
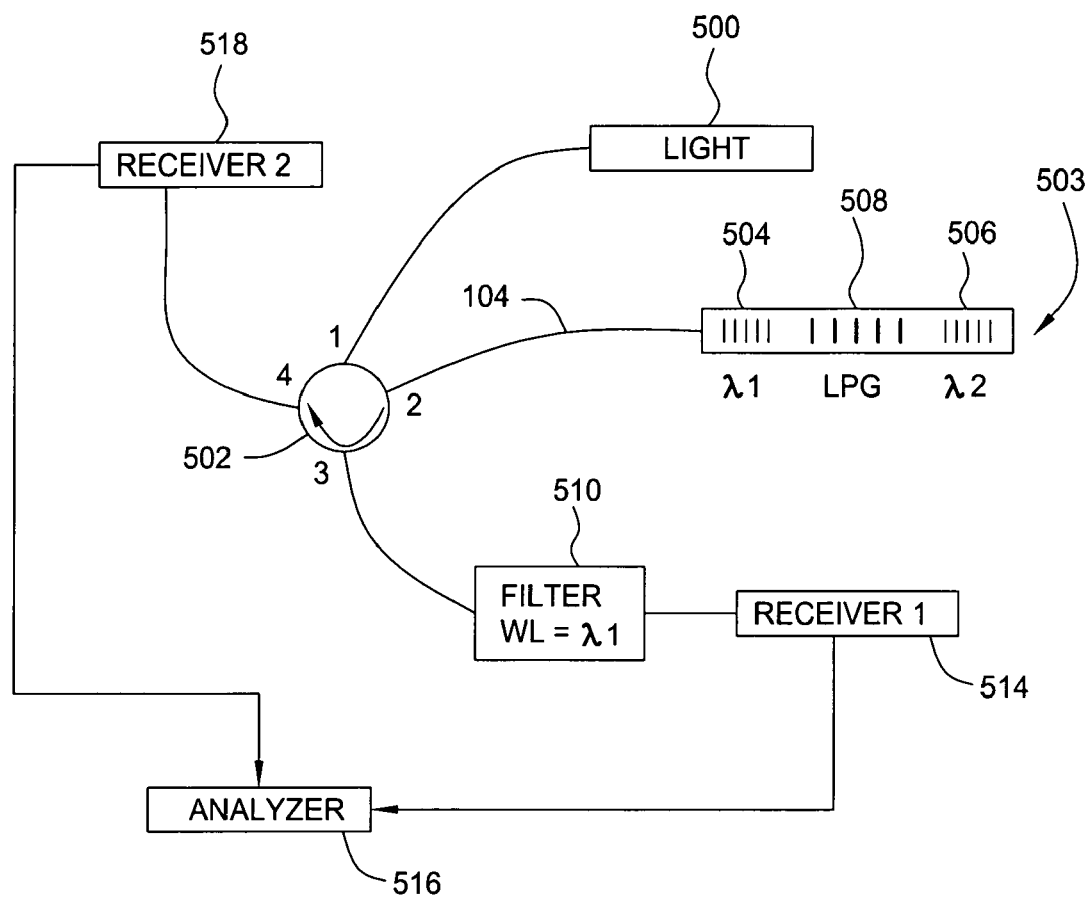
FIG. 5 schematically illustrates an optical waveguide AC strain measurement system.

In addition to providing dynamic pressure measurements, the principles of the present invention also provide for determining dynamic (AC) strain. One technique of doing this is illustrated in FIG. 5. As shown, a light source 500 launches light into port 1 of a 4 port circulator 502. That light is emitted from port 2 of the circulator 502 into an optical waveguide 104. That waveguide includes a sensor 503 that is comprised of two fiber Bragg gratings, 504 and 506. The gratings 504 and 506, which have different Bragg wavelengths $\lambda 1$ and $\lambda 2$, respectively, are separated by a long period grating 508 that is in a strain sensing field. When the light reaches gratings 504 and 506 those gratings reflect the Bragg wavelengths $\lambda 1$ and $\lambda 2$, respectively. However, there is a strain induced loss within the long period grating 508. Since $\lambda 1$ is reflected by grating 504 it signal is not attenuated by the long period grating 508, and thus the power of wavelength $\lambda 1$ can act as a reference power. However, the power of $\lambda 2$ depends on the loss within the long period grating 508, which in turn depends on the applied strain. Thus the ratio of the powers of $\lambda 1$ and $\lambda 2$ is a measure of strain on the long period grating. The long period grating 508 can also be disposed to measure strain due to applied pressure or some other stimuli.

Still referring to FIG. 5, the reflected light $\lambda 1$ and $\lambda 2$ on the optical waveguide 104 enters the circulator 502. Wavelength $\lambda 2$ passes through a wavelength filter 510, but wavelength $\lambda 1$ is reflected. The passed wavelength $\lambda 2$ is received and amplified by a first receiver 514. The output of receiver 514 is passed to an analyzer 516. Meanwhile, $\lambda 1$ is output from port 4 of the circulator 502. The wavelength $\lambda 1$ is received and amplified by a second receiver 518. The output of the second receiver 518 is applied to the analyzer 516. The analyzer 516 compares the ratio of the reflected wavelengths and determines the dynamic (AC) strain applied to the long period grating 508.

While the foregoing is directed to embodiments of the present invention, other and further embodiments of the invention may be devised without departing from the basic scope thereof, and the scope thereof is determined by the claims that follow.

The invention claimed is:

1. An optical sensor comprising:
 a light source for emitting light at a controlled wavelength;
 an optical waveguide with an optical sensing element having a Bragg grating, said Bragg grating for reflecting said light in accord with a shape function of reflected light amplitude verses wavelength, wherein said shape function includes a slope portion;
 a receiver for converting reflected light into electrical signal;
 a coupler for coupling said light into said optical waveguide and for coupling reflected light to said receiver; and
 an analyzer for controlling said wavelength such that said wavelength corresponds to a slope wavelength, said analyzer further for determining a physical parameter based on changes of amplitude of said reflected light, wherein said controlled wavelength corresponds to a half power point of said shape function.

2. The optical sensor of claim 1 wherein said Bragg grating is subjected to axial strain caused by external pressure.

3. The optical sensor of claim 1 wherein said light source is a tunable laser.

4. An optical sensor comprising:
 a light source for emitting light at a controlled wavelength;
 an optical waveguide with an optical sensing element having a Bragg grating, said Bragg grating for reflecting said light in accord with a shape function of reflected light amplitude verses wavelength, wherein said shape function includes a slope portion, and wherein said optical sensing element includes a narrow core that contains the Bragg grating and a cladding layer that is thinner around the Bragg grating than away from the Bragg grating;
 a receiver for converting reflected light into electrical signal;
 a coupler for coupling said light into said optical waveguide and for coupling reflected light to said receiver; and
 an analyzer for controlling said wavelength such that said wavelength corresponds to a slope wavelength, said analyzer further for determining a physical parameter based on changes of amplitude of said reflected light.

5. The optical sensor of claim 1, wherein said optical waveguide includes a second Bragg grating.

6. The optical sensor of claim 1, wherein said analyzer scans said light across a wavelength span to determine said slope.

7. An optical fiber sensor comprising:
- a light source for emitting light at a controlled wavelength;
- an optical fiber with an optical sensing element having a fiber Bragg grating, said fiber Bragg grating for reflecting said light in accord with a shape function of reflected light amplitude verses wavelength, wherein said shape function has a slope;
- a receiver for converting reflected light into electrical signal;
- a coupler for coupling said light into said optical fiber and for coupling reflected light to said receiver; and
- an analyzer for controlling said wavelength such that said wavelength corresponds to a slope wavelength, said analyzer further for determining a physical parameter based on changes of amplitude of said reflected light, wherein said controlled wavelength corresponds to a half power point of said shape function.

8. The optical fiber sensor of claim 7 wherein said fiber Bragg grating is subjected to axial strain caused by external pressure.

9. The optical fiber sensor of claim 7 wherein said light source is a tunable laser.

10. The optical fiber sensor of claim 7 wherein said optical sensing element includes a narrow core that contains the fiber Bragg grating and a cladding layer that is thinner around the fiber Bragg grating than away from the fiber Bragg grating.

11. The optical fiber sensor of claim 7, wherein said optical fiber includes a second fiber Bragg grating.

12. The optical fiber sensor of claim 7, wherein said analyzer scans said light across a wavelength span to determine said slope.

* * * * *